July 25, 1950 — W. B. McGORUM — 2,516,232
AGITATING DEVICE FOR MAKING FROZEN DESSERTS
Filed Dec. 31, 1948 — 3 Sheets-Sheet 1
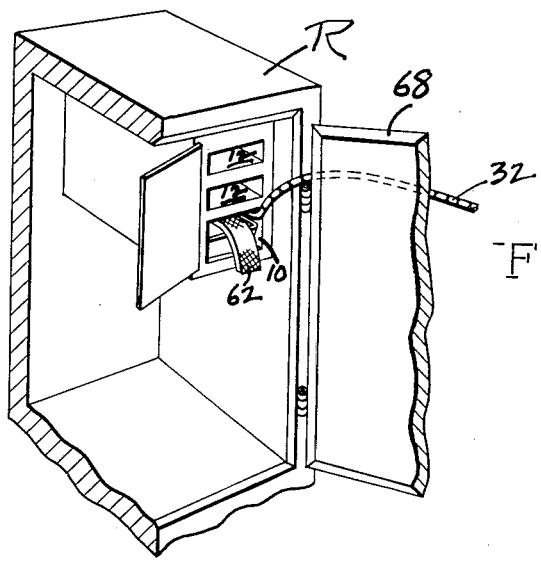
FIG_1_
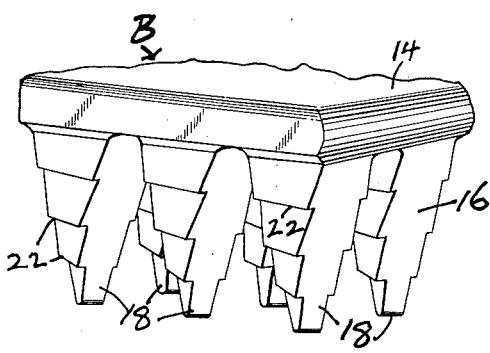
FIG_7_
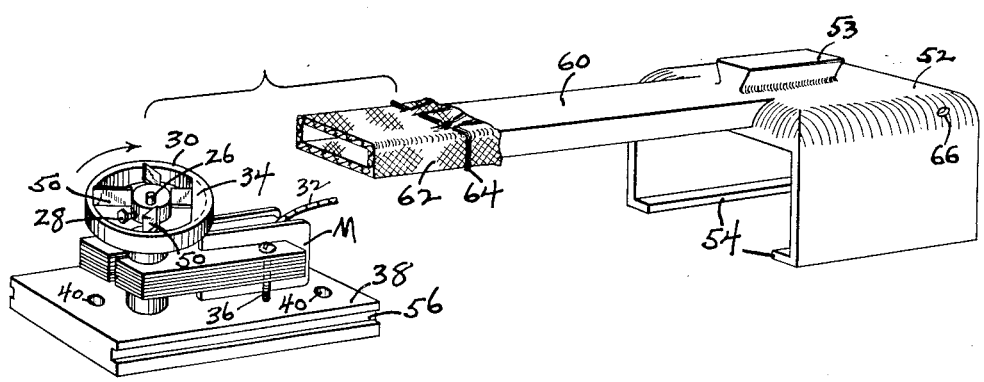
FIG_8_
INVENTOR
WILLIAM B. McGORUM
BY George R. Ericson
ATTORNEY

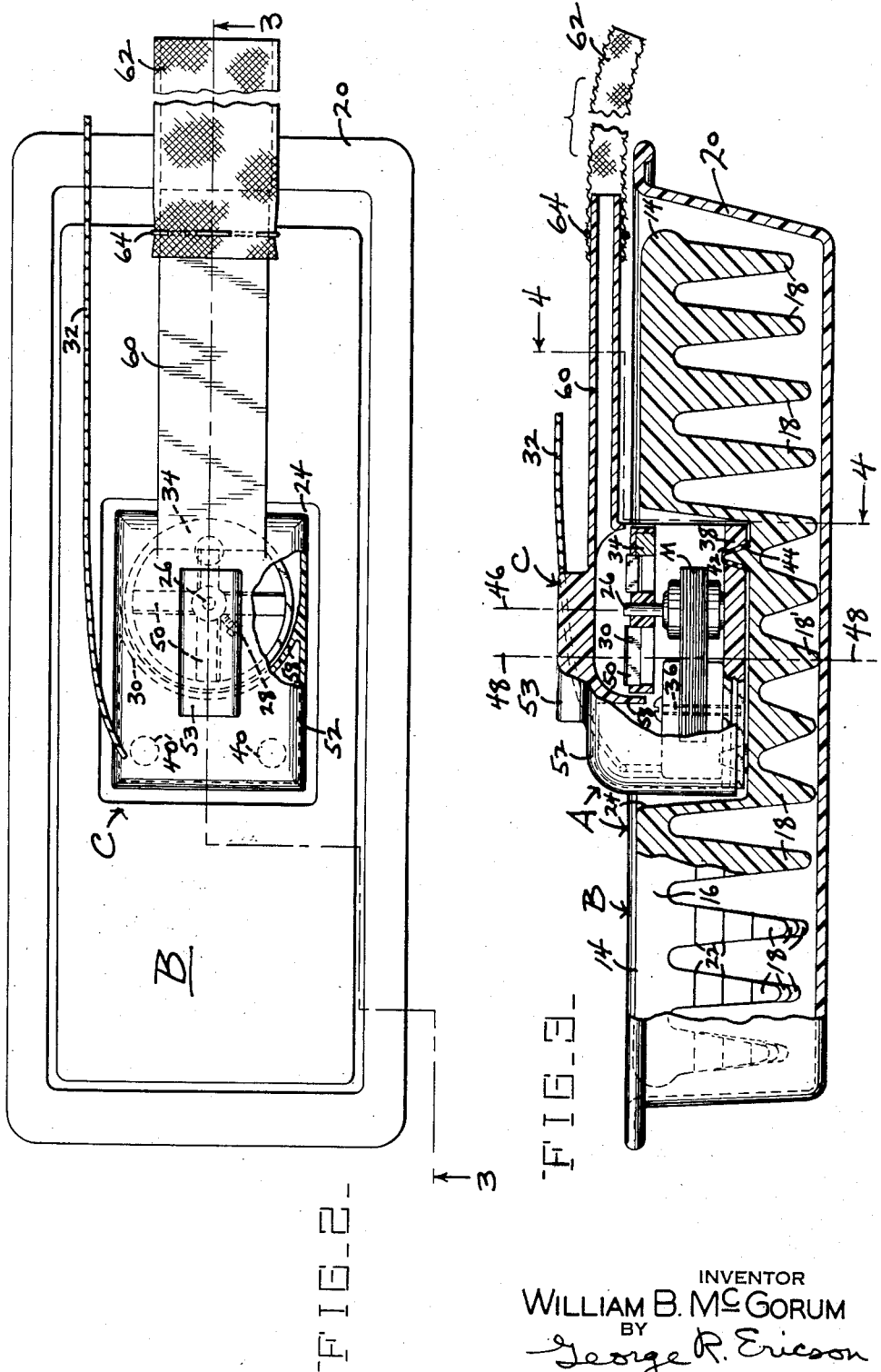

July 25, 1950     W. B. McGORUM     2,516,232
AGITATING DEVICE FOR MAKING FROZEN DESSERTS
Filed Dec. 31, 1948     3 Sheets-Sheet 3
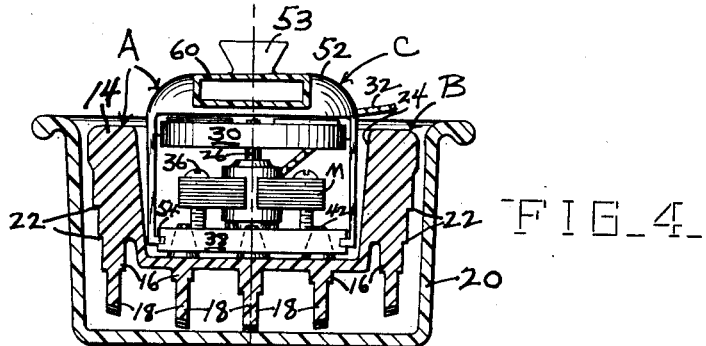
FIG_4_
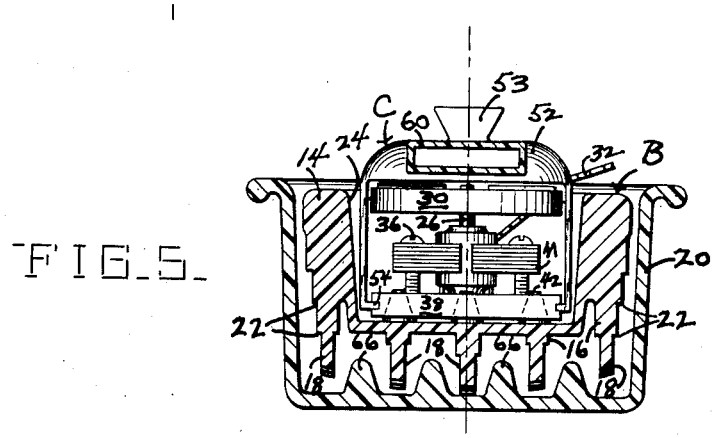
FIG_5_
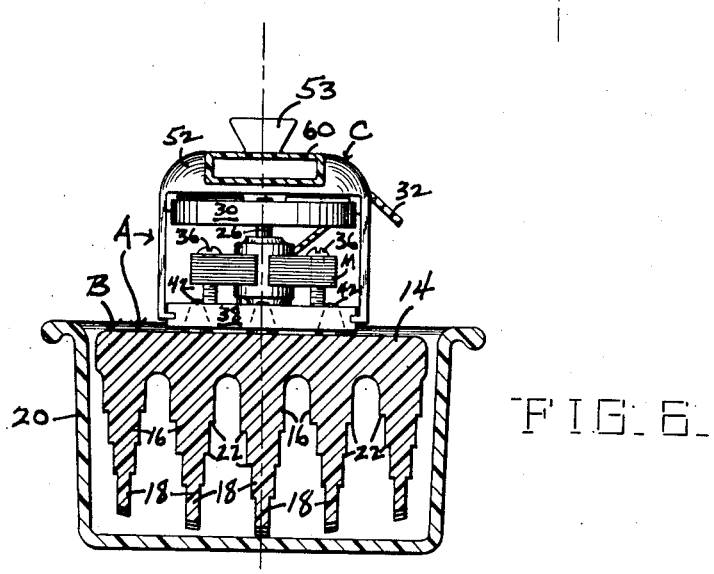
FIG_6_
INVENTOR
WILLIAM B. McGORUM
BY
George R. Ericson
ATTORNEY Patented July 25, 1950

2,516,232

UNITED STATES PATENT OFFICE 2,516,232

AGITATING DEVICE FOR MAKING FROZEN DESSERTS

William B. McGorum, Pelham, N. Y.

Application December 31, 1948, Serial No. 68,705

13 Claims. (Cl. 259—99)

This invention relates to agitating devices particularly adapted for use in making ice cream, sherbets and other frozen desserts in household refrigerators or freezers.

To make ice cream and similar frozen desserts having the desired smooth texture and consistency, the mixture of the various ingredients must be continuously and thoroughly agitated while freezing to avoid formation of undesirable coarse ice crystals. It has been difficult if not impossible to make really satisfactory ice cream and the like in home refrigerators largely because of the inefficient and inadequate agitating devices available for this purpose. Some of these devices are of the hand-manipulated type that accomplish little more than an occasional stirring of the freezing mixture and are inconvenient to use, requiring frequent attention and effort. Various kinds of mechanically operated devices have been used, but most of these merely move the mixture back and forth in one direction and fail to produce the thorough agitation necessary during the freezing process. Further, many of these devices are mechanically actuated through gearing and the like or by electromagnetic means usually necessitating the provision of some sort of safety shut-off mechanism to stop operation of the device when the mixture has become solidly frozen. In addition, where the device is driven or actuated by an electric motor, the heat generated acts to retard the freezing process unless provision is made for carrying it away from the freezing zone.

It is an object of my invention to provide an agitating device for making ice cream and the like in household refrigerators or freezers capable of imparting a multi-directional vibratory motion to the mixture to insure its thorough agitation and homogeneous freezing.

Another object of the invention is to provide a device of the kind described actuated by power driven means removably carried by it but having no mechanical connection with it, thus eliminating the need for gearing and the like and the provision of safety shut-off mechanism.

Still another object of the invention is to provide an agitating device actuated by electric motor means in which the heat generated thereby is carried away from the freezing compartment, reducing to a minimum its effect in retarding freezing of the mixture.

A further object of the invention is to provide a receptacle for use with the above described device so formed as to cooperate therewith in promoting a more thorough agitation of the mixture while being frozen in the receptacle.

These and other objects of the invention will be apparent to those skilled in the art from a study of the following description taken with the accompanying drawings, in which:

Figure 1 is a fragmentary perspective view of a household refrigerator showing the application of the device of my invention to a freezing compartment thereof.

Figure 2 is a plan view of the device with a portion thereof broken away to more clearly disclose other portions of the structure.

Figure 3 is a longitudinal sectional view of the device taken on line 3—3 of Figure 2.

Figure 4 is a transverse sectional view taken on line 4—4 of Figure 3.

Figure 5 is a view similar to Figure 4, but showing the device as used with my improved type of receptacle.

Figure 6 is a view similar to Figures 4 and 5, but showing a modification in the manner of mounting the actuator means.

Figure 7 is a fragmentary perspective view of the device showing a modified form of the serrated dasher members or blades.

Figure 8 is a view in perspective showing the actuating and heat venting means for the device with its cover removed to more clearly disclose the construction.

Referring now more in detail to the drawings, Figure 1 shows the application of the agitating device of my invention, generally indicated at A, in a freezing compartment 10 of a conventional mechanical household refrigerator R. This is merely for illustrative purposes, however, since the device may be used in any available freezing chamber or compartment, such as the ice tray compartments 12, and may be of any desired size for use in compartments of various dimensions.

The device A comprises generally two separable parts or elements; an agitator unit B and an actuator unit C. The agitator unit B is formed with a main portion 14 from which depend a plurality of spaced apart longitudinally extending dasher blades 16, as shown in Figure 4. The lower ends of the dasher blades 16 are terminated on a curve or arc extending in both a lengthwise and transverse direction outwardly from the center of the agitator unit B, and are serrated, as more clearly shown in Figure 3, to provide a plurality of dasher members 18. The agitator unit B is adapted to be placed in a receptacle 20, of conventional design, which may be an ordinary refrigerator ice tray or freezing pan containing the ice cream or similar mixture to be frozen, and is of such size as to be slightly shiftable in a horizontal plane both longitudinally and transversely in the receptacle or tray. It will thus be seen that the depending dasher members 18 are of varying lengths and their lower ends terminate to lie on an arc extending outwardly from the lower end of the central dasher member designated 18' in Figure 3. In other words, the depending dasher members 18 and dasher blades 16 are so formed and arranged that the agitator unit B is capable of rocking or oscillating rolling movements both lengthwise and sidewise in the receptacle 20, as well as being horizontally shiftable relative thereto. The motions or movements of the agitator unit in the receptacle may thus be likened to the fore and aft pitching and sidewise rolling of a boat since it is capable of rotation about both longitudinal and transverse horizontal axes passing through its center of mass located at a point within the central dasher member 18'. The depending dasher members 18 are each gradually tapered downwardly toward their lower ends and are formed on opposite sides in a lengthwise direction with a series of converging shoulders 22 for a purpose later to be explained. The top main portion 14 of the agitator unit B is formed to provide a recess or cavity 24 for the reception therein of the actuator unit C now to be described.

The actuator unit C consists of a small, compact electric motor M to the shaft 26 of which is fixed by means of screw 28 an unbalanced or counterweighted rotor disc 30. Any one of several well-known types of light-weight motors is suitable for the purpose of my invention, having relatively small over-all dimensions and high rate of R. P. M. The motor M is supplied with electric current through a conductor cord 32 plugged into any convenient outlet adjacent the refrigerator or to one provided inside the refrigerator with which many of the more modern types are equipped. The unbalanced rotor disc 30 may be made of any suitable material such as light-weight metal or plastic and is provided with a counterweight 34 of lead or similar heavy metal in the form of an insert, or it may be in the form of a thickened portion of the metal made integral with the rotor disc. The motor M is secured by bolts 36 to a mounting or base plate 38 having three cone-shaped holes 40 located on the points of a triangle and with which three similarly shaped lugs or projections 42 on the bottom of recess 24 are adapted to register when the actuator unit C is mounted in operative position therein on agitator unit B. The lugs 42 are covered with rubber or similar resilient caps or bushings 44, providing a firm yet somewhat flexible three-point mounting for the actuator unit on the agitator unit when in use, yet permitting their easy separation after use. The device will have a certain amount of buoyancy when immersed in the mixture contained in the receptacle 20, which is increased by provision of the recess 24. A substantial part of the weight of the device is thus supported by flotation or suspension in the mixture rather than by the dasher blades themselves bearing on the bottom of the receptacle. This arrangement permits maximum freedom of movement for the device in the receptacle and also results in more quiet operation by reducing to a minimum the impact of the dasher blades or members against the bottom of the receptacle.

The cavity 24 in the agitator unit B is so located that when the actuator unit C is operatively mounted therein its dynamic center of mass, which is at a point somewhere along the line 46, is off-set or off-center with respect to the center of mass of the agitator unit B, which is at some point on the line as indicated at 48. The center of mass of the device as a whole, that is, of the agitator unit B and the actuator unit C when operatively assembled for use, will be at a point somewhere in between these two lines, but the dynamic center of mass of the actuator unit C will still be off-center with respect to this center of mass of the device as a whole. It will thus be seen that the distance between these centers of mass will act as a moment arm and the forces set up by rotation of the unbalanced or counterweighted rotor disc 30 will cause the device to oscillate about both longitudinal and transverse horizontal axes passing through its center of mass. In addition, the rapidly rotating weighted disc, by centrifugal action, will in the meantime cause shifting of the agitator unit B in a horizontal plane in both longitudinal and transverse directions with respect to the receptacle or tray 20. The agitator unit B is thus capable of high-frequency vibratory rolling, rocking and shifting motions to produce a high degree of agitation or turbulence in the freezing mixture contained in the tray 20. The shoulders 22, previously referred to, will function to promote a still more thorough agitation of the mixture by a pumping or displacing action occurring when the agitator unit B with its depending dasher members 18 is rolling or rocking to force the shoulders 22 arcuately up and down through the mixture being frozen in the receptacle 20. As more clearly shown in Figure 3, the depending dasher members 18 are gradually tapered downwardly towards their lower ends to facilitate easy removal of the agitator unit B from the mixture after it has become solidly frozen.

The electric motor M of the agitator unit C will obviously generate a certain amount of heat during its operation which, if allowed to remain in the immediate vicinity of the freezing zone or compartment, will retard the freezing of the mixture. To remedy this obvious disadvantage, the unbalanced rotor disc 30 is so constructed as to function as a fan in venting the generated heat from the freezing compartment and away from the receptacle containing the mixture. The rotor disc is provided with vanes or ribs 50, as more clearly shown in Figure 8, which act as a fan to draw the heated air away from the motor M when the rotor disc is rotating in the direction indicated by the arrow. The actuator unit C is substantially enclosed by a removable cover 52, of plastic or similar suitable material, provided with a handle 53. This cover 52 is formed along its bottom side edges with inturned ledges 54 adapted to slide in grooves 56 formed at opposite side edges of the motor mounting plate 38, thus affording an easy means of application and removal of the cover. In order to provide a pathway for the heated air leading away from the motor M, the cover 52 is formed with a curved shroud member 58, as shown in Figures 2 and 3, depending interiorly from its top portion and extending around the inner side of the rotor disc 30. The top of cover 52 is also formed with an air outlet or duct 60 extending outwardly from the shroud member 58 and provided on its end portion with a sleeve 62, of fabric or other flexible material, held in place by an elastic band 64 and of sufficient length to extend outside of the freezing compartment 10 into the main refrigerating chamber of the refrigerator. It will thus be seen that air heated by the motor M will be conducted by action of the fan vanes 50 of rotor disc 30 into shroud member 58, through outlet duct 60 and sleeve 62, and into the large volume of the refrigerator as a whole rather than into the restricted space of the freezing compartment. Replacement air will of course flow into the freezing compartment from the refrigerator interior. This air is cool and because of its relatively large quantity the heating effect on the freezing compartment due to air-cooling the motor will be held to a minimum. All of the heat generated by the motor will of course be eventually absorbed by the refrigerator, but there is considerable practical advantage in its not being localized within the freezing compartment, thus minimizing its effect in retarding freezing of the mixture.

As shown in Figure 5, the bottom of the receptacle or tray 20 may be formed with spaced rows of upstanding projections or ribs extending between and adapted to cooperate with the dasher blades 16. This arrangement will impart to the mixture a still greater degree of agitation than with the use of a flat-bottomed receptacle by producing a squeezing action on the mixture between the projections 66 and shoulders 22 of the dasher members 18. In all other respects the modification of Figure 5 is the same as the device previously described.

A further modification of the invention is shown in Figure 6 for use where the height limitations of the freezing compartment will permit. This arrangement is the same as that previously described except that the excess in the agitator unit B has been eliminated and the actuator unit C is mounted directly on top of the agitator unit. This modified mounting of the actuator unit C obviously results in increased capacity of the mixture containing freezing tray 20.

The dasher members 18 may also take the modified form as shown in Figure 7. In this modification the dasher members are skewed or twisted to impart a swirling or eddying motion to the mixture, thus further promoting increased agitation thereof which, when combined with the pumping and displacing action of shoulders 22 on the dasher members 18 produces a high degree of turbulence in the mixture.

In assembling the device for use, the cover 52 is first applied in place over the actuator unit C by sliding the ledges 54 in the grooves 56 on motor-mounting plate 38, the conductor cord 32 having previously been passed through the hole 66 in the cover, or it may be brought out through the open end of cover 52. The actuator unit is then applied by means of handle 53 to the agitator unit B which has been immersed in the mixture contained in the receptacle 20, the cone-shaped holes 40 slipping over the conical projections 42. The entire assembly is then placed in the freezing compartment and the cord 32 plugged into an electrical outlet provided within the refrigerator or into the nearest available outlet adjacent the exterior of the refrigerator by being passed between the flexibly gasketed edge of the refrigerator door 68 and the body of the refrigerator. Upon completion of the freezing process, the motor and its cover are readily lifted off the agitator unit and the latter easily withdrawn from the frozen mixture for cleaning. Should the motor M be left running after the mixture has become solidly frozen, no damage to the device will result since there is no positive mechanical connection, such as gearing and the like, between the actuator and agitator units and the frozen mixture will merely act to dampen the vibratory movements of the device.

The invention may be modified in various respects as will occur to those skilled in the art and the exclusive use of all modifications as come within the scope of the appended claims is contemplated.

What is claimed is:

1. In combination with a receptacle containing a mixture to be frozen, an agitating device comprising an agitator unit shiftably carried in the receptacle, said agitator unit being provided with a plurality of spaced dasher blades having their lower ends lying on an arc whereby to permit rocking movement of said agitator unit in at least one direction in the receptacle, and power driven actuator means for imparting shifting and rocking movements to said agitator unit while the mixture is freezing in the receptacle.

2. In combination with a receptacle containing a mixture to be frozen, an agitating device comprising an agitator unit shiftably carried in the receptacle, said agitator unit being provided with a plurality of spaced dasher blades having their lower ends lying on arcs extending respectively in longitudinal and transverse directions whereby to permit lengthwise rocking and sidewise oscillatory rolling movements of said agitator unit in the receptacle, and power driven actuator means for causing shifting of said agitator unit and imparting said movements thereto while the mixture is freezing in the receptacle.

3. In combination with a receptacle containing a mixture to be frozen, an agitating device comprising an agitator unit shiftably carried in the receptacle, said agitator unit being provided with a plurality of spaced dasher blades serrated to form a plurality of dasher members, said dasher members having their lower ends lying on an arc extending in at least one direction whereby to permit rocking movements of said agitator unit in the receptacle, and power driven actuator means for causing shifting and rocking movements of said agitator unit while the mixture is freezing in the receptacle.

4. In combination with a receptacle containing a mixture to be frozen, an agitating device comprising an agitator unit shiftably carried in the receptacle, said agitator unit being provided with a plurality of downwardly tapering dasher members having their lower ends lying on an arc whereby to permit rocking movement of said agitator unit in the receptacle, and a motor driven actuator unit for imparting vibratory shifting and rocking movements to said agitator unit while the mixture is freezing in the receptacle.

5. In combination with a receptacle containing a mixture to be frozen, an agitating device comprising an agitator unit shiftably carried in the receptacle, said agitator unit being provided with a plurality of dasher members formed with downwardly converging shoulders at the sides thereof, said dasher members having their lower ends lying on an arc whereby to permit oscillatory rolling movement of said agitator unit in the receptacle, and a motor operated actuator unit for causing vibratory shifting and said oscillatory rolling movements of said agitator unit while the mixture is freezing in the receptacle.

6. In combination with a receptacle containing a mixture to be frozen, an agitating device comprising an agitator unit carried in and shiftable relative to the receptacle, said agitator unit being provided with a plurality of depending dasher members, said dasher members being skewed or twisted in cross section and having their lower ends lying on an arc whereby to permit oscillatory rolling movement of said agitator unit in the receptacle, and a motor operated actuator unit for transmitting vibratory shifting and said rolling movements to said agitator unit while the mixture is freezing in the receptacle.

7. In a device for agitating a mixture to be frozen, an agitator unit carried in and shiftable relative to the receptacle containing the mixture, said agitator unit having a recess formed therein, and a power driven actuator unit mounted in the recess and operative to transmit vibratory shifting movements to said agitator unit during the process of freezing the mixture in the receptacle.

8. In a device for agitating a mixture to be frozen, an agitator unit carried in and shiftable relative to the receptacle containing the mixture, said agitator unit having depending dasher members formed with their lower ends terminated to lie on an arc whereby to support the agitator unit for rocking motion in at least one direction in said receptacle, and a motor operated unbalanced rotary actuator unit removably carried by said agitator unit for causing high-frequency shifting and rocking motions thereof during freezing of the mixture in said receptacle.

9. In a device for agitating a mixture to be frozen, an agitator unit arranged in and shiftable relative to the receptacle containing the mixture, said agitator unit being formed with depending dasher members of varying lengths so arranged as to rockably support the agitator unit in said receptacle, and a motor operated unbalanced rotary actuator unit carried by and located off-center with respect to the center of mass of said agitator unit and acting to transmit vibratory shifting and rocking motions thereto during freezing of the mixture in said receptacle.

10. In combination with a receptacle containing a mixture to be frozen, an agitating device receivable in the receptacle and shiftable relative thereto, said agitating device being provided with a plurality of spaced serrated dasher blades depending therefrom, said serrated dasher blades having their ends terminated to lie on an arc whereby to support the agitating device for rocking motion in the receptacle, electric motor actuating means carried by said device and having a rotary shaft, and an unbalanced rotor member fixed to said motor shaft whereby to cause said actuating means to transmit vibratory shifting and rocking motions to said agitating device while the mixture is freezing in the receptacle.

11. In a device for agitating a mixture to be frozen, an agitator unit carried in and shiftable relative to the receptacle containing the mixture, an actuator unit mounted on said agitator unit comprising an electric motor having a shaft, and a counterweighted rotor member fixed to rotate with said motor shaft whereby to impart vibratory shifting movements to the agitator unit during freezing of the mixture in the receptacle, said rotor member being formed to act as a fan to air cool said motor.

12. In a device for agitating a mixture to be frozen, an agitator unit carried in and shiftable relative to the receptacle containing the mixture, an actuator unit mounted on said agitator unit comprising an electric motor having a shaft, a counterweighted rotor member fixed to rotate with said motor shaft whereby to impart vibratory shifting movements to the agitator unit during freezing of the mixture in the receptacle, and a removable cover adapted to substantially enclose said motor provided with an air outlet leading therefrom, said rotor member being formed to act as a fan to conduct air heated by said motor through said outlet.

13. In combination with the freezing compartment of a refrigerator, a receptacle in the compartment containing a mixture to be frozen, an agitating device comprising an agitator unit immersed in the mixture and shiftable relative to the receptacle, an actuator unit carried by the agitator unit including an electric motor having a shaft, a counterweighted rotor member fixed to rotate with said motor shaft whereby to impart vibratory shifting movements to the agitator unit during freezing of the mixture, and a removable cover for substantially enclosing said motor having an air outlet leading therefrom out of said freezing compartment into the refrigerator, said rotor member being formed to act as a fan to exhaust heat generated by said motor through said air outlet.

WILLIAM B. McGORUM.

REFERENCES CITED

The following references are of record in the file of this patent:

UNITED STATES PATENTS

| Number | Name | Date |
|---|---|---|
| 1,881,361 | Killman | Oct. 4, 1932 |
| 1,988,542 | Coleman et al. | Jan. 22, 1935 |
| 2,024,482 | Sinks | Dec. 17, 1935 |
| 2,082,752 | Lewis et al. | June 1, 1937 |
| 2,087,415 | Scott | July 20, 1937 |
| 2,353,492 | O'Connor | July 11, 1944 |